(12) United States Patent
Mastro et al.

(10) Patent No.: US 7,432,821 B1
(45) Date of Patent: Oct. 7, 2008

(54) FIBER OPTIC MEASUREMENT OF BEARING SURFACE WEAR

(75) Inventors: Stephen A. Mastro, Glen Mills, PA (US); John K. Overby, Nottingham, PA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 296 days.

(21) Appl. No.: 11/268,402

(22) Filed: Nov. 1, 2005

(51) Int. Cl.
*G08B 13/24* (2006.01)
*G01J 1/04* (2006.01)

(52) U.S. Cl. .................................. 340/682; 250/227.11
(58) Field of Classification Search .................. 340/682, 340/672; 250/225.14, 227.11, 358.1; 702/34, 702/35, 40
See application file for complete search history.

(56) References Cited

U.S. PATENT DOCUMENTS 6,080,982 A * 6/2000 Cohen .................... 250/227.11

* cited by examiner

*Primary Examiner*—Jeff Hofsass
*Assistant Examiner*—Sigmund Tang
(74) *Attorney, Agent, or Firm*—Jacob Shuster

(57) ABSTRACT

A propeller shaft is supported on the stern end of a ship hull by a bearing within which optic fiber cables are embedded in close spaced relation to the outer cylindrical surface of a bearing supported portion of the propeller shaft for a monitoring wear thereof with maximum accuracy. An optical data acquisition system having a light source and a graphic display is operatively connected to the optic fiber cables through inserted optic connector cables to transmit light from the light source as a signal medium into the bearing so as to render the optic fiber cables therein operative as sensors to detect and measure wear of the entire bearing portion of the propeller shaft surface being thereby monitored. Wear measurement optical signals within the wear sensing cables are then transmitted back to the data acquisition system through the optic connector cables for display of the shaft bearing wear measurements.

12 Claims, 2 Drawing Sheets

FIBER OPTIC MEASUREMENT OF BEARING SURFACE WEAR

The present invention relates generally to fiber optic measurement of mechanical surface wear on a propeller bearing.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The use of fiber optic filaments embedded within a bearing through which a powered propeller shaft extends for optically sensed measurement of shaft bearing wear is generally known, as disclosed for example in U.S. Pat. No. 6,080,982 issued Jun. 27, 2000 to Edward Isaac Cohen. The geometry associated with such optic fiber sensing measurement of propeller shaft bearing wear is limited to the sensing of shaft wear at fore and aft ends of the bearing which are deemed to be the most critical areas of wear along the axial length of the bearing. It is therefore an important object of the present invention to provide for accurate and more complete measurement of propeller shaft bearing wear along the entire axial length of the bearing.

SUMMARY OF THE INVENTION

Pursuant to the present invention, measurement of propeller shaft bearing wear, based on the amount of light transmitted through optic fiber filaments, is effected by configured embedment of a bundle of the optic fiber filaments within a radially inner liner of the bearing which extends axially in close surrounding relation to the rotating propeller shaft throughout its entire bearing length. The bearing embedded optic fiber filament bundle is operatively connected by an insertable fiber optic connector plug to opto-electronics through which the embedded optic fiber bundle is rendered operative for most complete sensing and measurement of shaft wear throughout the bearing axial length, while allowing for easy removal, repair and reinstallation of bearing parts.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
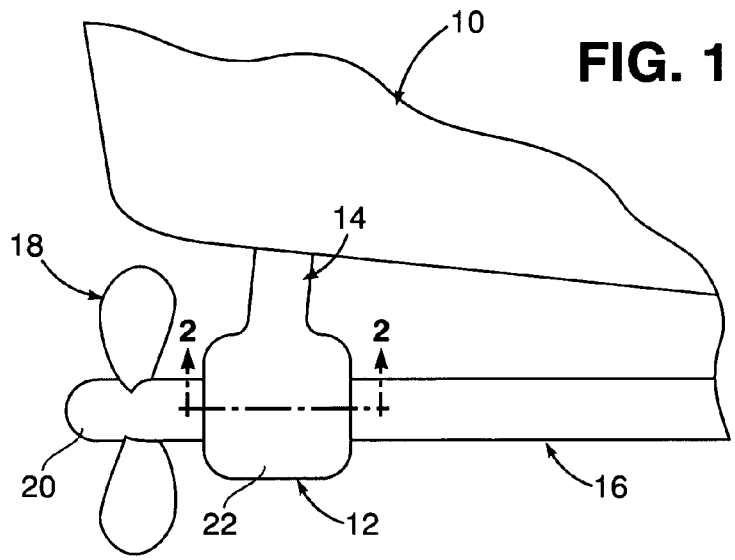
FIG. 1 is a partial side elevation view of the stern end portion of a ship hull, showing installation of a bearing supported propeller shaft through which propulsion of the ship hull is effected.
Figure 2:
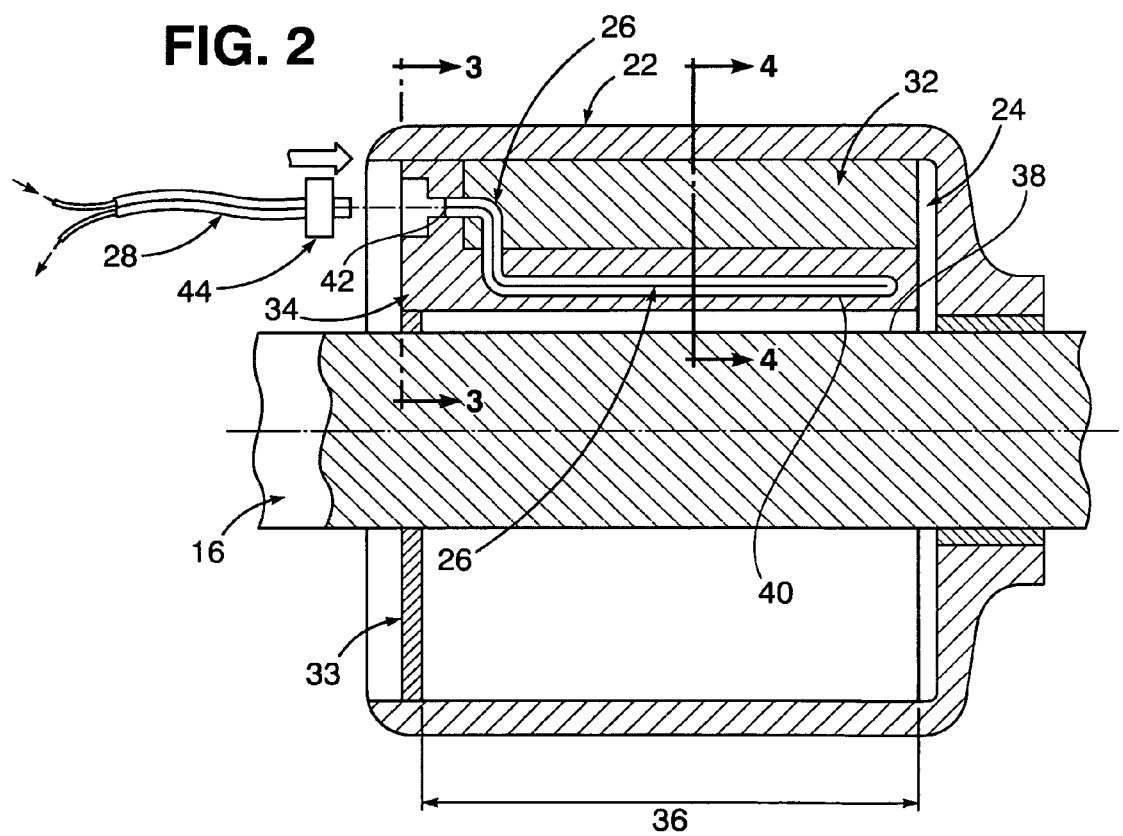
FIG. 2 is a section view taken substantially through a plane indicated by section line 2-2 in FIG. 1.

Referring now to the drawing in detail, FIG. 1 illustrates a stern end portion of a ship hull 10 having a bearing support 12 suspended therefrom by a strut 14. A power driven propulsion shaft 16 extends through the bearing support 12 with a propeller blade 18 attached to a rear end portion 20 of the shaft 16. As shown in FIG. 2, the bearing support 12 has an outer housing 22 within which mechanical stave type of bearing devices 24 are enclosed about the shaft 16. Each of the bearing devices 24 corresponds to those disclosed in U.S. Pat. No. 6,080,982 to Edward Isaac Cohen, so as to accommodate embedment therein of a bundle 26 of fiber optic filaments adapted to be connected by an optical fiber connector cable 28 to an opto-electric type of data acquisition system 30, as diagrammed in FIG. 5, for measurement and display of bearing surface wear of the shaft 16 reflected by the amount of light transmitted through the fiber filaments in the bundles 26.

Figure 3:
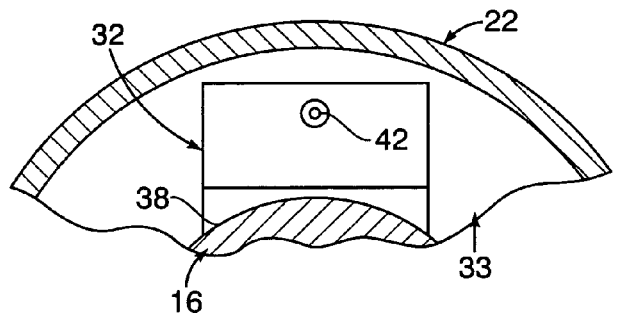
FIGS. 3 and 4 are partial section views taken substantially through planes indicated by section lines 3-3 and 4-4 in FIG. 2.
Figure 4:
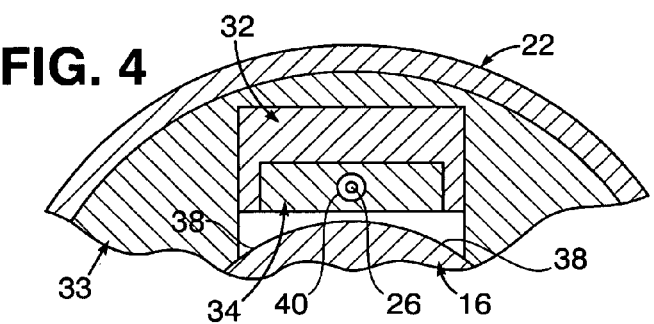
Figure 5:
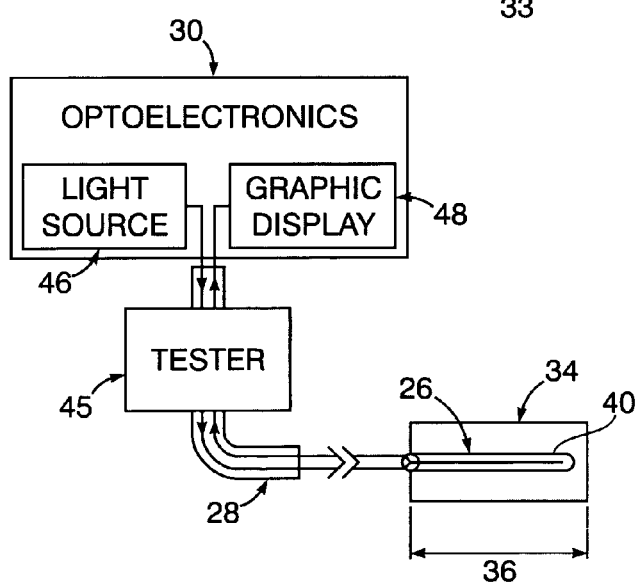
FIG. 5 is a schematic diagram of the bearing wear measurement facilities associated with the propeller shaft installation illustrated in FIGS. 1, 2, 3 and 4.

Each of the bearing devices 24 as shown in FIGS. 2, 3 and 4 has a grooved bearing shell 32 positioned within an annular retainer 33 within the housing 22 for positioning of an inner liner 34 extending axially along an axial measurement section 36 of the shaft 16 as indicated in FIG. 2, in close spaced relation to an outer cylindrical surface 38 of the shaft 16. A passage 40 is formed within the inner liner 34, as shown in FIGS. 2 and 4, extending axially in radially spaced relation to the outer surface 38 of the shaft 16 between opposite axial ends of the liner 34. The optical fiber bundle 26 fills the passage 40 for positioning thereof in such close radially spaced relation to the outer shaft surface 38 throughout along the shaft measurement section 36. The optical fiber bundle 26 associated with each of the bearing devices 24 at one axial end 42, as shown in FIG. 2, is adapted to be engaged by an inserted plug 44 connected to the optical connector cable 28. Such plugs 44 are respectively inserted into each of the bearing devices 24 for interconnection of the optic fiber cables 26 and 28 to a tester 45, as designated in FIG. 5, so as to establish optical signal connections between the data acquisition system 30 and the bearing devices 24. When such signal connections are established, signals in the form of light from a light source 46 associated with the system 30 as diagrammed in FIG. 5 is transmitted to the optic fiber cable 26 within the liner 34 so as to provide an optical light signal in response to detection of surface wear of the shaft 16. Upon generation of such optical wear detection signal, it is transmitted from the optic fiber cable 26 through the connector cable 28 to a graphic display 48 associated with the system 30.

Figure 5A:
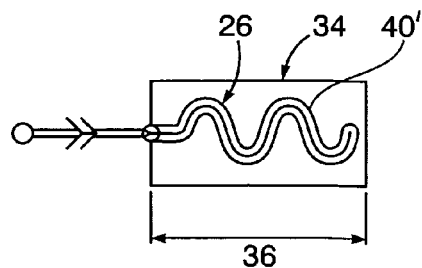
FIG. 5A is a schematic diagram corresponding to a portion of the diagram shown in FIG. 5, pursuant to another embodiment of the present invention.

As diagrammed in FIG. 5, the optic fiber cable 26 acting as a sensor is positioned in the passage 40 within the liner 34 of the bearing device 24 establishing a straight cable passage path along the axial wear measurement section 36 of the shaft 16 according to one embodiment. According to another embodiment as diagrammed in FIG. 5A, a cable passage path 40' for the cable 26 along the axial wear measurement section 36 has a wave-shape configuration. In either case, bearing wear of the shaft 16 is continuously monitored along the length of the wear measurement section 36 during rotation of the shaft 16. Detection and readout of any shaft surface bearing wear throughout the entire axial length of the shaft 16 within the bearing support 12 is thereby achieved.

Furthermore, the heretofore described arrangement involving insertable plug engagement of the connector cable 28 with the cable 26, enables easy disconnection thereof from the data acquisition system 30 and removal for repair of the bearing devices 24.

Obviously, other modifications and variations of the present invention may be possible in light of the foregoing teachings. It is therefore to be understood that within the scope of the appended claims the invention may be practiced otherwise than as specifically described.

What is claimed is:

1. In combination with bearing means for rotational support of a shaft, the bearing means having an inner liner positioned over an axially extending surface of the shaft and data acquisition means comprising:
    optic-electronics means for generation and display of optical signals reflecting detection of bearing surface wear;
    optic fiber cable sensing means positioned within the inner liner and extending axially along the entire length of said bearing means in close spaced relation to the shaft, for detection of the bearing surface wear; and
    connector means optically connecting the optic-electronics means with the optic fiber cable sensing means.

2. The combination as defined in claim 1, wherein said optic fiber cable sensing means is positioned within the inner liner along a straight axial path.

3. The combination as defined in claim 1, wherein said optic fiber cable sensing means is positioned within the inner liner along a wave-shaped axial path.

4. In combination with a bearing through which a shaft extends, data acquisition means for measurement of bearing wear, comprising:
    a bundle of optic-fiber filaments positioned within the bearing about the shaft and extending the entire axial length of the bearing in close spaced relation to the shaft;
    a connector optically connecting the data acquisition means with the bundle of optic-fiber filaments;
    signal generating means including a light source for generation of optical signals reflecting bearing wear sensed within the bundle of the optic-fiber filaments; and
    graphic display means for receiving the optical signals and indicating the bearing wear along the entire bearing axial length.

5. The combination as defined in claim 4, wherein said bundle of optic-fiber filaments has an axially straight configuration along the axial length of the bearing.

6. The combination as defined in claim 4, wherein said bearing is mounted on a stern end portion of a ship hull and said shaft is power driven and has a propeller blade thereon.

7. The combination as defined in claim 4, wherein said bundle of optic-fiber filaments has an axially wave-shaped configuration along the axial length of the bearing.

8. A system for measuring wear of a bearing having a power driven shaft extending therethrough, comprising:
    a bundle of fiber-optic filaments positioned within said bearing in close spaced relation to a bearing surface and extending axially the entire length of said bearing in continuous close spaced relation to the power driven shaft;
    signal generating means operatively connected to the bundle of fiber-optic filaments for transmission of optical signal light therethrough; and
    measurement means operatively connected to the bundle of fiber-optic filaments and the signal generating means for indicating wear along the entire bearing surface reflected by changes in the optical signal light transmitted after exposure of the bearing surface thereto.

9. The system as defined in claim 8, wherein said measurement means includes a graphic display device.

10. The system as defined in claim 9, including: an insertable connector cable interconnecting the bundle of optic-fiber filaments with the measurement means within the bearing.

11. The system as defined in claim 10, wherein said power driven shaft has propeller blades mounted thereon and the bearing is fixed to a stern end portion of a ship hull.

12. The system as defined in claim 8, wherein said power driven shaft has propeller blades mounted thereon and the bearing is fixed to a stern end portion of a ship hull.

\* \* \* \* \*